United States Patent
Gay et al.

(10) Patent No.: US 10,198,206 B2
(45) Date of Patent: Feb. 5, 2019

(54) MEMORY MODE CATEGORIZATIONS

(71) Applicant: Hewlett-Packard Development Company, L.P., Houston, TX (US)

(72) Inventors: Raphael Gay, Fort Collins, CO (US); Kirsten Olsen, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/544,667

(22) PCT Filed: Apr. 17, 2015

(86) PCT No.: PCT/US2015/026477
§ 371 (c)(1),
(2) Date: Jul. 19, 2017

(87) PCT Pub. No.: WO2016/167807
PCT Pub. Date: Oct. 20, 2016

(65) Prior Publication Data
US 2017/0364299 A1    Dec. 21, 2017

(51) Int. Cl.
*G06F 12/00*         (2006.01)
*G06F 3/06*          (2006.01)
(Continued)

(52) U.S. Cl.
CPC .......... *G06F 3/0634* (2013.01); *G06F 3/0604* (2013.01); *G06F 3/0653* (2013.01); (Continued)

(58) Field of Classification Search
CPC .. G06F 3/0634; G06F 11/3433; G06F 3/0604; G06F 3/0653; G06F 3/0673; G06F 11/3006; G06F 11/3027; G06F 2201/81
See application file for complete search history.

(56) References Cited

U.S. PATENT DOCUMENTS 5,636,361 A * 6/1997 Ingerman ............ G06F 13/4022
                                                          711/147
5,893,144 A    4/1999 Wood et al.
(Continued)

FOREIGN PATENT DOCUMENTS

WO    WO-2014-074169 A1    5/2014

OTHER PUBLICATIONS

E. Hansson et al. "Optimized Selection of Runtime Mode for the Reconfigurable PRAM-NUMA Architecture REPLICA Using Machine-Learning" 2014, Lecture Notes, vol. 8806, pp. 133-145.
(Continued)

*Primary Examiner* — Mark A Giardino, Jr.
(74) *Attorney, Agent, or Firm* — Brooks, Cameron & Huebsch PLLC (57) ABSTRACT

Example implementations relate to memory mode categorization. An example memory mode categorization can include determining local and remote data bandwidths received at each of a first processor and a second processor for a data sample, comparing the local and the remote data bandwidths to a first threshold bandwidth and a second threshold bandwidth, respectively, creating a traffic pattern for the data sample based on the comparison, and categorizing the data sample as being a candidate for a particular memory mode based on the created traffic pattern.

15 Claims, 5 Drawing Sheets

(51) Int. Cl.
  *G06F 11/34* (2006.01)
  *G06F 13/00* (2006.01)
  *G06F 13/28* (2006.01)
  *G06F 11/30* (2006.01)

(52) U.S. Cl.
  CPC ........ *G06F 3/0673* (2013.01); *G06F 11/3433* (2013.01); *G06F 11/3006* (2013.01); *G06F 11/3024* (2013.01); *G06F 11/3027* (2013.01); *G06F 11/3037* (2013.01); *G06F 2201/81* (2013.01)

(56) References Cited

U.S. PATENT DOCUMENTS

| | | | |
|---|---|---|---|
| 6,587,938 B1 * | 7/2003 | Eilert | G06F 9/5061 712/13 |
| 7,681,006 B2 | 3/2010 | Mailloux et al. | |
| 7,877,593 B2 | 1/2011 | Tomlin et al. | |
| 8,006,062 B1 | 8/2011 | Cheng et al. | |
| 8,112,756 B2 * | 2/2012 | Cherkasova | G06F 9/505 708/1 |
| 2008/0162878 A1 * | 7/2008 | Zimmer | G06F 9/441 712/203 |
| 2012/0124587 A1 | 5/2012 | Li et al. | |
| 2013/0111035 A1 | 5/2013 | Alapati et al. | |
| 2013/0114421 A1 * | 5/2013 | Qian | H04L 43/0829 370/252 |
| 2014/0006696 A1 * | 1/2014 | Ramanujan | G11C 13/0004 711/103 |
| 2014/0089603 A1 * | 3/2014 | Krishnapura | G06F 12/0831 711/146 |
| 2014/0176586 A1 | 6/2014 | Gruber et al. | |
| 2015/0067268 A1 | 3/2015 | Barton et al. | |
| 2017/0220389 A1 * | 8/2017 | Michael | G06F 9/5027 |

OTHER PUBLICATIONS

PCT Search Report and Written Opinion, Application No. PCT/US2015/026477 dated Jan. 15, 2016, 10 pages.

\* cited by examiner

MEMORY MODE CATEGORIZATIONS

BACKGROUND

Non-uniform memory access (NUMA) and memory node interleaving (MNI) are computer memory designs used in multi-processing. Under NUMA, memory access time depends on the memory location relative to the processor. In such an example, a processor may access its own local memory faster than non-local memory. Under MNI, memory may be interleaved across a subset of nodes in a multi-processor system.

DETAILED DESCRIPTION

Multi-processor systems may be set up for NUMA or MNI memory modes. Each mode provides noticeable performance differences depending on the application and workload. As used herein, a workload may include any program a user is running on a system. Customers may not have the awareness, skills and/or time to test the different memory modes for particular applications or workloads, leading to improper or inefficient use of NUMA or MNI memory modes. For instance, a customer may use a default NUMA memory mode, which may not be optimal for their particular applications and/or workloads.

In contrast, examples of the present disclosure include an analysis of hardware performance counter information and calculation of which memory mode may yield the best performance for each customer's specific application and/or workload usage model. Examples of the present disclosure may provide guidance to customers based on their actual performance, for instance, based on memory footprint of an application, data models, and/or an amount of total memory size available in the customer's system. Examples of the present disclosure can result in improved use of underlying system hardware such that underlying memory architecture in the system is used more efficiently and workload and/or application performance is improved.

Additionally, in contrast to other approaches that do not take into account data traffic patterns, examples of the present disclosure include analyzing data traffic patterns, and categorizing a data sample as MNI memory mode-favorable, NUMA memory mode-favorable, or indifferent, for instance.

Figure 1:
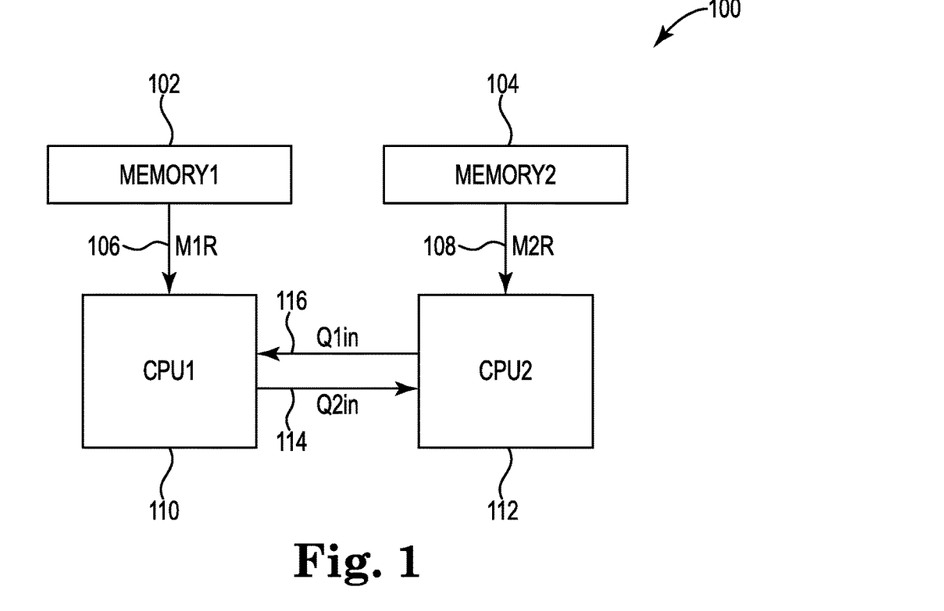
FIG. 1 illustrates a diagram of an example system including memory interfaces and interconnect interfaces.

FIG. 1 illustrates a diagram of an example system 100 including memory interfaces and interconnect interfaces. System 100 may include two central processing units (CPUs) 110 and 112. While the example illustrated in FIG. 1 includes two CPUs, examples are not so limited. In some instances, interface 100 may include more than two CPUs. CPU1 110 may receive data from its own memory1 102 (e.g., via a memory interface) or from CPU2 112 (e.g., via an interconnect interface).

When more data is received by CPU1 110 from CPU2 112 than from its own memory1 102, it may be referred to as a "remote" case, "remote data sourcing" or "remote" data. When more data is received by CPU1 110 from its own memory1 102, than from CPU2 112, it may be referred to as a "local" case, "local data sourcing," or "local" data. Similarly, CPU2 112 may receive data from its own memory2 104 (e.g., via a memory interface) or from CPU1 110 (e.g., via an interconnect interface). When more data is received by CPU2 112 from CPU1 110 than from its own memory2 104, it may be referred to as a "remote" case, "remote data sourcing," or data. When more data is received by CPU2 112 from its own memory2 104 than from CPU1 110, it may be referred to as a "local" case, "local data sourcing," or "local" data. In some instances, the interconnect interface(s) may include a QuickPath Interconnect (QPI), which is a point-to-point processor interconnect.

Data from each source may have a particular bandwidth. Data bandwidth information, in some examples, may come from hardware performance counters, among other sources. For instance, data received at CPU1 110 from memory1 102 may have a bandwidth passed via link M1R 106. Data received at CPU1 110 from CPU2 112 may have a bandwidth via link Q1in 116. Data received at CPU2 112 from memory2 104 may have a bandwidth via link M2R 108. Data received at CPU2 112 from CPU1 110 may have a bandwidth via link Q2in 114.

In a number of examples, performance of CPU1 110 may be greater if more data and/or higher bandwidth data is received at CPU1 110 from memory1 102 than is received from CPU2 112. CPU1 110 performance may decrease should more data and/or higher bandwidth data be received at CPU1 110 from CPU2 112 than is received from memory1 102. Similarly, performance of CPU2 112 may be greater if more data and/or higher bandwidth data is received at CPU2 112 from memory2 104 than is received from CPU1 110. CPU2 112 performance may decrease should more data and/or higher bandwidth data be received at CPU2 112 from CPU1 110 than is received from memory2 104.

Examples of the present disclosure may include detecting patterns of incoming data rates in remote and local cases across CPU1 110 and CPU2 112. These patterns may be used to determine whether NUMA memory mode or MNI memory mode is a more efficient mode for an application and/or workload.

For example, NUMA memory mode may target memory accesses on a single processor, while MNI memory mode may interleave memory accesses across two processors. As such, different applications and/or workloads may perform differently in different memory modes. In some instances, an "indifferent" categorization may be made, such that neither mode has a substantially greater efficiency (e.g., neither NUMA nor MNI memory mode favored). As used herein, substantially greater efficiency may include a comparative efficiency above a particular threshold.

In an example of the present disclosure, link 116 may include 4 gigabytes per second (G/s) of data bandwidth, while link 106 includes less than 4 G/s of data bandwidth. This means that more data is coming to CPU1 110 through link 116 than from local memory1 102, which is an example of remote data sourcing. In this example, MNI memory mode may perform better than NUMA memory mode because it may force every other memory access to come from alternating processors and interleave with one another. The values in this example are only examples; different values are possible and examples of the present disclosure are not so limited.

Continuing the example of the present disclosure, CPU2 112 is considered; specifically with respect to links 108 and 114. A memory mode categorization may be made with respect to data passing through links 108 and 114, and this categorization can be considered in combination with the decision made with respect to CPU1 110. In such an example, a matrix of possible combinations of different remote and local cases may result in a number of traffic patterns. Memory mode categorizations may be made with respect to these traffic patterns. For instance, categorizations as to which memory mode best suits each of the traffic patterns may be made. Particular traffic patterns may favor MNI memory mode, NUMA memory mode, or may not favor one over the other (e.g., indifferent).

To make a memory mode categorization, a data sample may be observed. As used herein, a data sample includes data moving through the system (e.g., a workload and/or an application) gathered over a particular period of time, for instance one second, ten seconds, thirty seconds, etc. If it is determined that the data sample is MNI favorable, a calculation may be performed with respect to how favorable. A weighting process may be used in such an example. If it is determined that the data sample is not MNI favorable, it may be determined whether the data sample is NUMA favorable or indifferent. If the data sample is determined to be NUMA favorable, a determination is made as to how favorable. Again, a weighting process, which will be discussed further herein, may be used.

Figure 2:
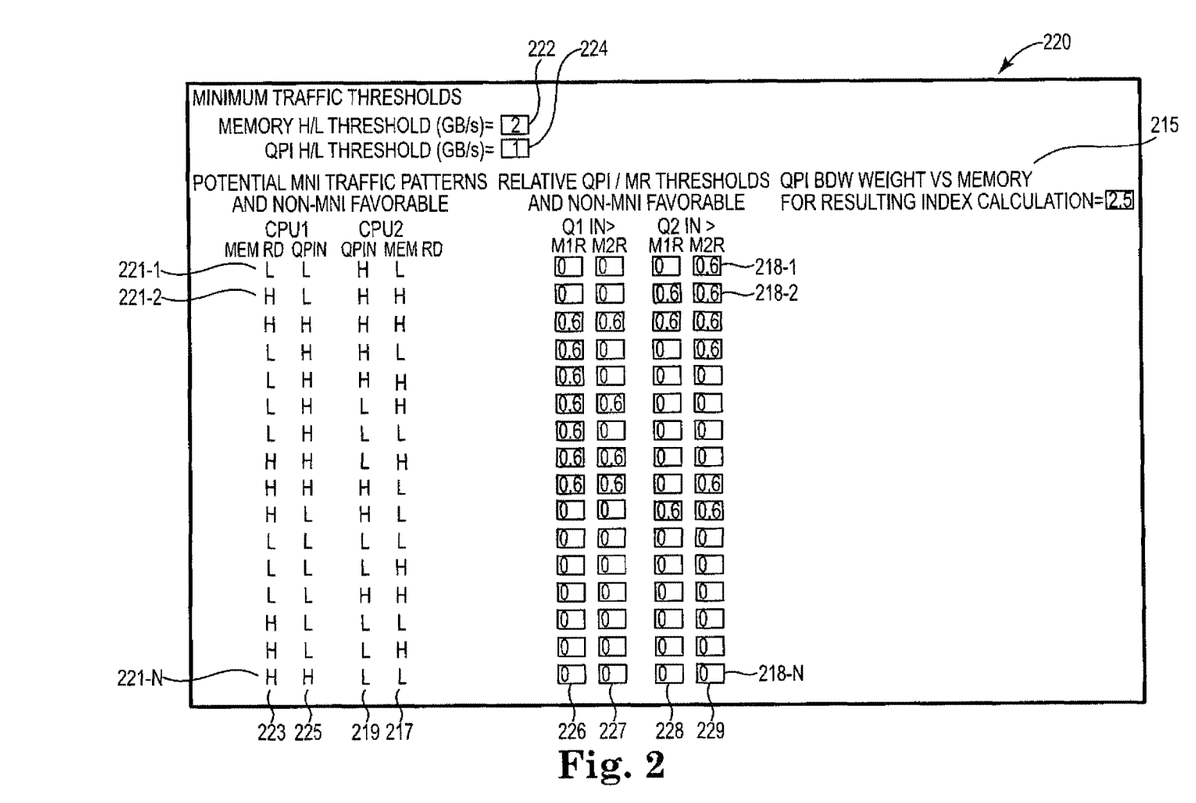
FIG. 2 illustrates a table associated with memory mode categorization according to an example.

FIG. 2 illustrates a table 220 associated with memory mode categorization according to an example. Table 220 illustrates parameter settings for mechanisms used to detect cases favorable to MNI memory mode. Minimum data bandwidth thresholds are illustrated at 222 and 224. As used herein, a minimum data bandwidth threshold is a threshold that when exceeded results in a "high" (H) data bandwidth classification. When a data bandwidth falls below the minimum data bandwidth threshold, it may receive a "low" (L) data bandwidth classification with a value of zero. In the example illustrated in FIG. 2, a minimum data bandwidth threshold 222 for a local case is 2 GB/s. A minimum data bandwidth threshold 224 for a remote case is 1 GB/s. Examples of the present disclosure are not limited to these values, however.

A minimum data bandwidth threshold may be determined to take into account only substantial enough local and remote activities. By incorporating minimum data bandwidth thresholds, background operating system activities and/or user processes that are not linked to main applications and/or workloads of interest may be filtered. For instance, in some examples, search indexing, network background activity, and/or browser background activities, among others, may be filtered. This may be beneficial because even when a system is idle this kind of activity happens and may skew the memory mode analysis without showing benefits due its random and unobstructive traffic nature.

Also illustrated in FIG. 2 are columns 226, 227, 228, and 229. These columns include relative remote (also known as QPI)/local (also known as MR) data bandwidth thresholds for MNI-favorable determinations. Each row 218-1, 218-2, . . . , 218-n may lead to a binary representation of a traffic pattern. Using a number of parameters, including the aforementioned data bandwidth minimum thresholds, data bandwidths and data traffic patterns may be calculated, and each sample may be categorized as being a best candidate for NUMA or MNI or indifferent mode.

Relative remote/local thresholding (e.g., using a relative remote/local thresholding equation) may define bandwidth ratios between remote and local cases to cross in order for a determination to be made that the data traffic for that condition is more remote-focused (MNI favorable) than local-focused (NUMA favorable). Threshold values in columns 226, 227, 228, 229 and rows 218-1, 218-2, . . . , 218-n may have values different than 1 based on a performance penalty. A performance penalty for receiving data in a remote case (e.g., from a remote processor) is higher than a performance penalty for receiving data from local memory due to higher latencies. The performance penalty used within relative remote/local thresholding compensates for that. For instance, a value of 0.6 means that 0.6 GB/s of data bandwidth coming from remote memory is approximately as impactful as 1 GB/s of data bandwidth coming from local memory.

Columns 223, 225, 219, and 217 and rows 221-1, 221-2, . . . , 221-n include potential MNI memory mode-favorable traffic patterns and non-MNI memory mode-favorable traffic patterns. Each column represents a different value. Column 223 represents a data bandwidth received at a first processor (CPU1) from local memory ("MemRd"), column 225 represents a data bandwidth received at the first processor from remote memory ("QPIn"), column 219 represents a data bandwidth received at a second processor (CPU2) from remote memory ("QPIn"), and column 217 represents a data bandwidth received at the second processor from local memory ("MemRd").

For example, looking at row 221-1, column 223 includes a value of "L", column 225 includes a value of "L", column 219 includes a value of "H", and column 217 includes a value of "L". An "L" represents data bandwidth received below a minimum traffic threshold 222 or 224, and an "H" represents data bandwidth received at or above a minimum traffic threshold 222 or 224. In this example, row 221-1 may be MNI memory mode-favorable, as CPU1 gets low data bandwidth from both local and remote memory, but CPU2 gets higher data bandwidth from remote memory.

In table 220, columns 223, 225, 219, and 217 and rows 221-1, 221-2, . . . , 221-n may be used to illustrate and/or detect which traffic patterns may potentially be MNI memory mode-favorable, NUMA memory mode-favorable, or indifferent. For instance, data samples may be collected and analyzed for their potential favorabilities. Columns 226, 227, 228, and 229, and rows 218-1, 218-2, . . . , and 218-n may then be used to illustrate and/or detect which traffic patterns actually are MNI memory mode-favorable, NUMA memory mode-favorable, or indifferent.

Another parameter is remote (QPI) bandwidth weight, illustrated in table 220 as the field 215. Similar to the remote/local threshold parameter, the remote bandwidth weight parameter may be used to assign a higher "importance" in index calculations to the remote bandwidth, relatively to local bandwidth. This it to represent a higher penalty on system performance of data traffic transiting in a remote case, due to higher latency and lower maximum bandwidth achievable compared to data coming from local memory.

Indices may also be a parameter used in memory mode categorization. Indices associated with each processor (e.g., three index series per processor) may be used to track data samples that are favorable to MNI memory mode, NUMA memory mode, or are indifferent. The indices may be calculated for each processor as the sum of the remote (QPI)

bandwidth multiplied by the remote bandwidth weight minus the local memory bandwidth. The resulting value can consequently be proportional to the amount of remote and local bandwidth for each sample. The indices may be used to track a corresponding data bandwidth value, also known as an index value.

In an example, each data sample may be determined to be favorable to MNI memory mode, NUMA, or to be indifferent. A corresponding index may be selected, and its value for that sample may be calculated as the difference of the weighted remote and local bandwidths as described further herein. For instance, a memory mode categorization may be made for an entire workload. Accordingly, for each data sample, memory mode categorizations may be made, weights and other considerations may be made and compared, and an overall workload memory mode categorization may be made.

Figure 3:
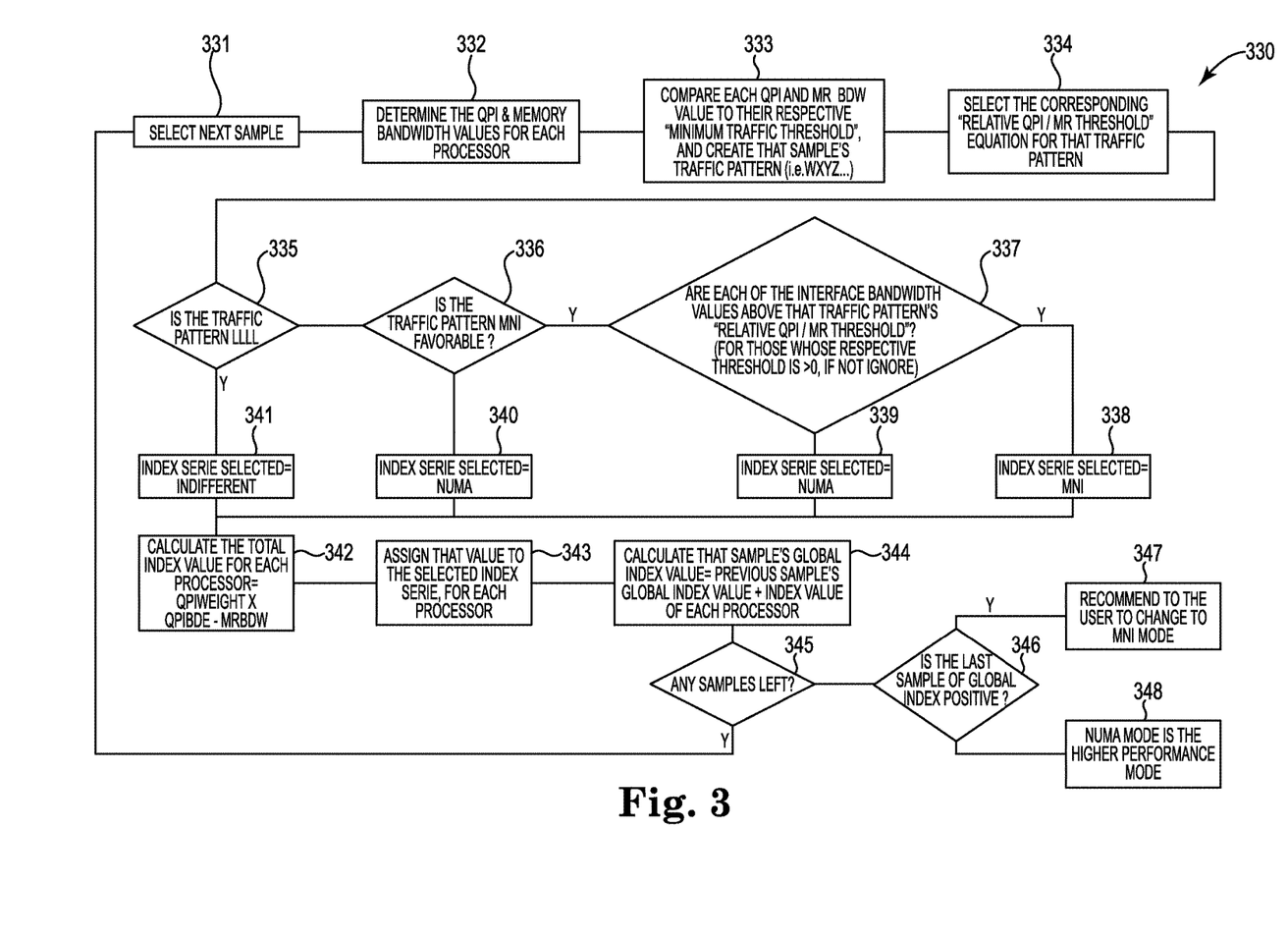
FIG. 3 illustrates a flow diagram of an example process for memory mode categorization according to an example.

FIG. 3 illustrates a flow diagram of an example process 330 for memory mode categorization according to an example. Process 330 may run in parallel with a user performing a workload and/or application, or can be run after the workload or application has completed based on the samples collected. At 331, a data sample is selected. Selecting the data sample may include choosing a time period in which to collect data. Data may be collected while a user is currently using the workload and/or application. The data sample may include data bandwidth information gathered from hardware. For instance, local and remote data bandwidth information may be part of the selected and collected sample. At 332, a determination of data bandwidth values is made for each processor (e.g., processors CPU1 and CPU2). Bandwidth values for remote cases and local cases may be determined. At 333, a comparison of each of the local and remote bandwidth data values is made to their respective minimum traffic threshold. For each comparison, a data sample traffic pattern is created (e.g., LLHL, HLHH, etc. as illustrated in FIG. 2).

A corresponding relative remote/local threshold equation is selected for each samples traffic pattern at 334. At 335, a determination is made as to whether the traffic pattern is below minimum traffic thresholds for both local and remote cases at both processors (e.g., LLLL). If it is determined that this is the case, an index classification of indifferent may be made at 341.

If a determination is made at 335 that the traffic pattern is not LLLL, a determination is made at 336 as to whether the traffic pattern is MNI memory mode-favorable. If at 336, it is determined that the traffic pattern is MNI memory mode-favorable, a determination is made at 337 as to whether each of the remote and local data bandwidth values is above that traffic pattern's relative remote/local threshold. If each of the remote and the local data bandwidth values are above the relative remote/local thresholds, an index classification of MNI memory mode-favorable may be made at 338.

If at 336 is it determined that the traffic pattern is not MNI memory mode-favorable, an index classification of NUMA memory mode may be made at 340. Similar, if at 337 it is determined that each of the remote and local bandwidth values are below the traffic patterns relative remote/local threshold, an index classification of NUMA may be made at 339.

At 342, a total index value for each processor is calculated. This calculation may include multiplying a remote weight factor with a remote bandwidth value. A local bandwidth value can be subtracted from the result (e.g., QPIWeight×QPIbdw−MRbdw). The calculated total index value may be assigned to the selected index classification (index "serie") for each processor at 343. At 344, the sample's global index value is calculated. This calculation may include the previous sample's global index value plus the index value of each processor.

The global index represents a conclusion at each sample regarding whether all samples before that sample point toward an MNI, NUMA, or indifferent conclusion. For example, at each sample, for each processor, there may be one of three index classifications assigned a value which represents a difference in weighted remote and local data bandwidth. At the end of the analysis (after all samples have been analyzed), the following values may be determined for each processor: total MNI amount of "weighted bandwidth," which is the sum of all the samples in the MNI series, total NUMA amount of "weighted bandwidth," which is the sum of all the samples in the NUMA series, and total indifferent amount of "weighted bandwidth," which is the sum of all the samples in the indifferent series.

For each processor, it may be determined whether MNI memory mode may be beneficial. Such a determination may include determining if the MNI total is greater than the NUMA total. If the MNI total is greater, it may be concluded that for the particular processor, MNI memory mode would likely result in higher performance as compared to NUMA memory mode. In an example including two processors, the processors' respective MNI and NUMA totals may be compared to determine which has the highest total and therefore the global total, also known as the global index.

In an example, a global index value may be calculated at each sample, and this global index value may include the sum of each processor's total index value. For instance, each processor's total index at each sample (the remote weight multiplied by the remote bandwidth minus the local bandwidth (QPIWeight×QPIbdw−MRbdw)) is positive if the weighted amount of remote bandwidth is higher than local memory's (MNI favorable), or negative if it is not (NUMA favorable). As such, each processor's total index values may be added together. If the result is positive, the global remote bandwidth for that sample (weighted) may have a more prevalent impact on performance than the global local memory bandwidth. Therefore, the global index may be the accumulation of each processor's total indices over the entire workload and/or application.

Using the values that are the result of the QPIWeight×QPIbdw−MRbdw calculation for the MNI/NUMA/Indifferent series and the global index instead of only recording whether a sample is more favorable to MNI memory mode, NUMA memory mode, or indifferent may result in more accurate results. For instance, in an example including 1000 consecutive bandwidth samples taken during a workload to analyze, 100 of which are MNI memory mode favorable, and 900 of which are NUMA memory mode favorable, inaccuracy may arise. Assumptions may be made that more NUMA memory mode favorable samples means the overall workload is NUMA memory mode favorable. However, this may not be the case. For instance, the overall workload may be MNI memory mode favorable if 100 times more data is flowing during the MNI memory mode favorable samples. Therefore, to increase accuracy, the Indices calculated (NUMA, MNI, indifferent, global) are based on the QPIw×QPIbdw−MRbdw equation, for instance to take into account relative bandwidth amounts between samples.

Figure 4:
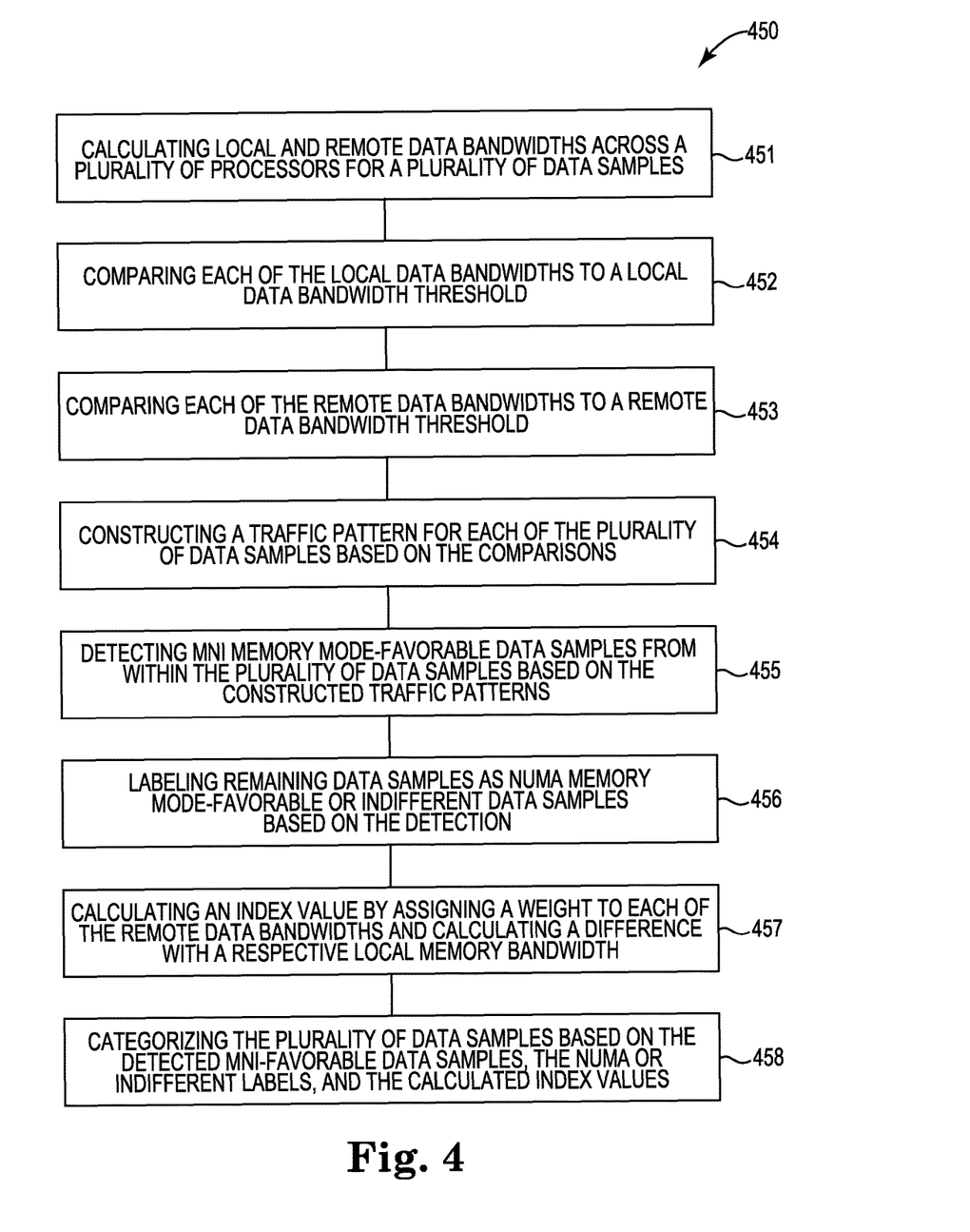
FIG. 4 illustrates a flow diagram of an example method for memory mode categorization according to an example.

At 345, a determination is made as to whether any samples remain. If there are further samples to analyze, the process begins again at 331. If there are no samples remaining, a determination is made at 346 as to whether the last sample of global index is positive. If it is not positive, NUMA memory mode is chosen as the higher performance memory mode at 348. If, at 346, it is determined the last sample of global index is positive, a recommendation may be made to a user to change to MNI memory mode at 347. For instance, if the added total index values (e.g., at 344) are greater than zero, MNI memory mode may be favorable. If the added total index values are not greater than zero, NUMA memory mode may be favorable FIG. 4 illustrates a flow diagram of an example method 450 for memory mode categorization according to an example. Method 450 may be performed while a user is running at least one of a workload and an application. For instance, data samples may be gathered without interruption to a user's workflow.

At 451, method 450 may include calculating local and remote data bandwidths across a plurality of processors for a plurality of data samples. For instance, a determination may be made as to whether more data bandwidth is received at each of the plurality of processors from local memory or remote memory.

At 452, method 450 may include comparing each of the local data bandwidths to a local data bandwidth threshold, and at 453, method 450 may include comparing each of the remote data bandwidths to a remote data bandwidth threshold. These comparisons may include classifications of "H" or "L" indicating the data bandwidths are at or above or below the aforementioned thresholds.

At 454, method 450 may include constructing a traffic pattern for each of the plurality of data samples based on the comparisons. For instance, patterns may include LLLL, LHLL, LLHL, among others, as illustrated in FIG. 2.

At 455, method 450 may include detecting MNI memory mode-favorable data samples from within the plurality of data samples based on the constructed traffic patterns, and at 456, method 450 may include labeling remaining data samples as NUMA memory mode-favorable or indifferent data samples based on the detection. Particular traffic patterns may be favorable to MNI memory mode, and those that are not may be categorized as either NUMA memory mode-favorable or indifferent.

At 457, method 450 may include assigning weights to the MNI, NUMA, and indifferent data samples based on the calculated local and remote data bandwidths. For instance, a weight parameter may be used to assign a higher weight (also known as importance) in index calculations to remote data bandwidth as compared to local data bandwidth because of higher latency and lower maximum data bandwidth achievable by data received from remote memory.

At 458, method 450 may include categorizing the plurality of data samples based on the MNI-favorable detections, the NUMA or indifferent labels, and the assigned weights. The parameters can be considered to determine a highest performing memory mode for each of the plurality of data samples. Categorizing the plurality of data samples can include categorizing each as at least one of MNI memory mode-favorable, NUMA memory mode-favorable, and indifferent. These categorizations may be used to determine an overall memory mode for the workload and/or application as a whole.

For instance, method 450 can include determining an overall favorable memory mode for a workload containing the plurality of data samples and recommending the overall favorable memory mode to a user. Method 450 may be performed iteratively, such that the method is repeated as the workload continues to be run. This may result in up-to-date recommendations based on users' actual use of the workload and/or an application. In some instances, the method may be performed automatically, such that data bandwidths, data traffic patterns, and categorizations are performed automatically. As used herein, automatically can include performing the method independently, near-continuously, and/or without user input.

Figure 5:
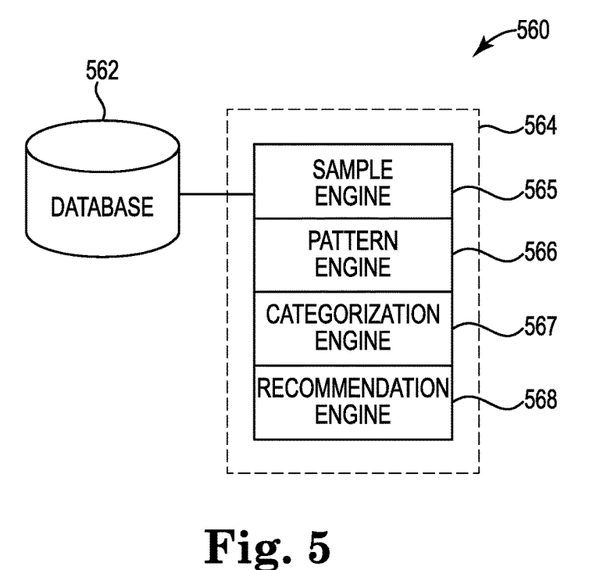
FIG. 5 illustrates a diagram of an example of a system including a database, a subsystem, and a number of engines according to an example.
Figure 6:
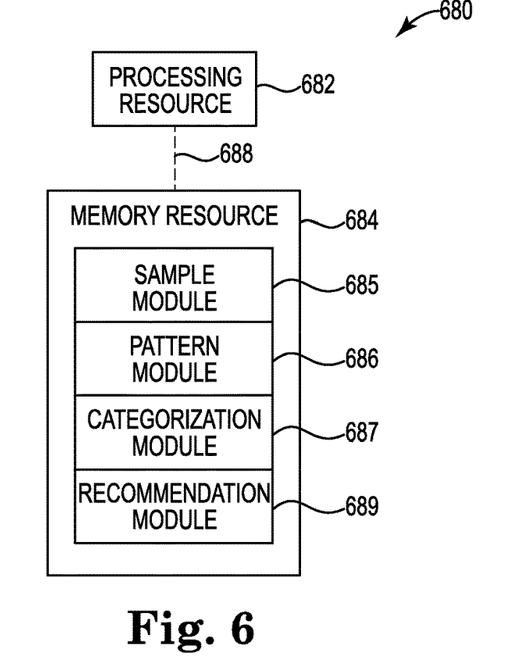
FIG. 6 illustrates a diagram of an example computing device including a processing resource, a memory resource, and a number of modules according to an example.

FIGS. 5 and 6 illustrate examples of systems 560, 680 according to the present disclosure. That is, FIG. 5 illustrates a diagram of an example of a system 560 including a database 562, a subsystem 564, and a number of engines 565, 566, 567, 568 according to an example. The subsystem 564 can include the number of engines in communication with the database 562 via a communication link. The system 560 can include additional or fewer engines than illustrated to perform the various functions described herein. The system 560 can represent instructions and/or hardware of a network controller (e.g., system 680 as referenced in FIG. 6, etc.).

The number of engines 565, 566, 567, 568 can include a combination of hardware and programming to perform functions including those described herein. The instructions can include instructions (e.g., software, firmware, etc.) stored in a memory resource (e.g., computer readable medium (CRM), machine readable medium (MRM), etc.) as well as hard-wired program (e.g., logic).

The sample engine 565 can include hardware and/or a combination of hardware and instructions to collect for a plurality of data samples associated with a running workload, local and remote data bandwidth values received at each of a first processor and a second processor. In some examples, the running workload is running in NUMA memory mode. The final memory mode recommendation may or may not be NUMA memory mode.

The pattern engine 566 can include hardware and/or a combination of hardware and instructions to construct traffic patterns for each of the plurality of data samples based on the received local and remote data bandwidth values. These patterns may be constructed based on comparisons to minimum data traffic thresholds.

The categorization engine 567 can include hardware and/or a combination of hardware and instructions to categorize each of the constructed traffic patterns as MNI memory mode-favorable, NUMA memory mode-favorable, or indifferent based on the constructed pattern. For instance, a more remote-focused data traffic pattern may favor an MNI memory mode, while a more local-focused data traffic pattern may favor a NUMA memory mode.

The recommendation engine 568 can include hardware and/or a combination of hardware and instructions to determine a most favorable memory mode for the running workload based on the categorized constructed traffic patterns. In some examples, the recommendation engine may determine the most favorable memory mode after the workload has stopped running. In some examples, this determination may be made based on indices associated with each of the first and second processors, as well as a global index.

FIG. 6 illustrates a diagram of an example computing device 680 including a processing resource 682, a memory resource 684, and a number of modules 685, 686, 687, 689 according to an example. The computing device 680 can utilize instructions (e.g., software and/or firmware) hardware, and/or logic to perform a number of functions including those described herein. The computing device 680 can be a combination of hardware and program instructions configured to share information. The hardware, for example, can include a processing resource 682 and/or a memory resource 684 (e.g., CRM, MRM, database, etc.).

A processing resource 682, as used herein, can include a processor capable of executing instructions stored by a memory resource 684. Processing resource 682 may be implemented in a single device or distributed across multiple devices. The program instructions (e.g., computer readable instructions (CRI)) can include instructions stored on the memory resource 684 and executable by the processing resource 682 to implement a desired function (e.g., memory mode categorization).

The memory resource 684 can be in communication with a processing resource 682. A memory resource 684, as used herein, can include memory components capable of storing instructions that can be executed by processing resource 682. Such memory resource 684 can be a non-transitory CRM or MRM. Memory resource 684 may be integrated in a single device or distributed across multiple devices. Further, memory resource 684 may be fully or partially integrated in the same device as processing resource 682 or it may be separate but accessible to that device and processing resource 682. Thus, it is noted that the computing device 680 may be implemented on a participant device, on a server device, on a collection of server devices, and/or a combination of the user device and the server device.

The memory resource 684 can be in communication with the processing resource 682 via a communication link (e.g., a path) 688. The communication link 688 can be local or remote to a machine (e.g., a computing device) associated with the processing resource 682. Examples of a local communication link 688 can include an electronic bus internal to a machine (e.g., a computing device) where the memory resource 684 is one of volatile, non-volatile, fixed, and/or removable storage medium in communication with the processing resource 682 via the electronic bus.

A module and/or modules 685, 686, 687, 689 can include CRI that when executed by the processing resource 682 can perform a number of functions including those described herein. The number of modules 685, 686, 687, 689 can be sub-modules of other modules. For example, the sample module 685 and pattern module 686 can be sub-modules and/or contained within the same computing device. In another example, the number of modules 685, 686, 687, 689 can comprise individual modules at separate and distinct locations (e.g., CRM, etc.).

Each of the number of modules 685, 686, 687, 689 can include instructions that when executed by the processing resource 682 can function as a corresponding engine as described herein. For example, the sample module 685 can include instructions that when executed by the processing resource 682 can function as the sample engine 686. Similar, each of the pattern module 686, categorization module 687, and recommendation module 689 can include instructions that when executed by the processing resource 682 can function as the pattern engine 566, categorization engine 567, and the recommendation engine 568, respectively.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein may be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. Further, as used herein, "a number of" an element and/or feature may refer to one or more of such elements and/or features.

What is claimed:

1. A non-transitory machine-readable medium storing instructions executable by a processing resource to cause a computing system to:
   determine local and remote data bandwidths received at each of a first processor and a second processor for a data sample;
   compare the local and the remote data bandwidths to a first threshold bandwidth and a second threshold bandwidth, respectively;
   create a traffic pattern for the data sample based on the comparison; and categorize the data sample as being a candidate for a particular memory mode based on the created traffic pattern.

2. The non-transitory machine-readable medium of claim 1, wherein the particular memory mode is at least one of non-uniform memory access (NUMA), memory node interleaving (MNI), or neither NUMA nor MNI memory mode favored.

3. The non-transitory machine-readable medium of claim 1, including instructions executable to:
   assign a higher importance value to the remote data bandwidth as compared to the local data bandwidth using a weight parameter; and
   calculate an index value comprising a difference between the higher importance valued remote data bandwidth value and the local data bandwidth value.

4. The non-transitory machine-readable medium of claim 3, including instructions executable to calculate a global index comprising an accumulated sum of index values across the first processor and the second processor for a plurality of data samples.

5. The non-transitory machine-readable medium of claim 1, wherein the first threshold bandwidth is a minimum local data bandwidth threshold, and the second threshold bandwidth is a minimum remote data bandwidth threshold.

6. A system, comprising:
   a sample engine to collect for a plurality of data samples associated with a running workload, local and remote data bandwidth values received at each of a first processor and a second processor;
   a pattern engine to construct traffic patterns for each of the plurality of data samples based on the received local and remote data bandwidth values;
   a categorization engine to categorize each of the constructed traffic patterns as memory node interleaved (MNI) memory mode-favorable, non-uniform memory access (NUMA) memory mode-favorable, or indifferent based on the constructed pattern; and
   a recommendation engine to determine a favorable memory mode for the running workload based on the categorized constructed traffic patterns.

7. The system of claim 6, including the recommendation engine to determine the favorable memory mode after the workload has stopped running.

8. The system of claim 6, wherein the running workload is running in NUMA memory mode.

9. The system of claim 6, including the recommendation engine to determine the most favorable memory mode further based on total index values associated with each of the first and second processors and a global index.

10. A method, comprising,
calculating local and remote data bandwidths across a plurality of processors for a plurality of data samples;
comparing each of the local data bandwidths to a local data bandwidth threshold;
comparing each of the remote data bandwidths to a remote data bandwidth threshold;
constructing a traffic pattern for each of the plurality of data samples based on the comparisons;
detecting memory node interleaved (MNI) memory mode-favorable data samples from within the plurality of data samples based on the constructed traffic patterns;
labeling remaining data samples as non-uniform memory access (NUMA) memory mode-favorable or indifferent data samples based on the detection;
calculating an index value by assigning a weight to each of the remote data bandwidths and calculating a difference with a respective local memory bandwidth; and
categorizing the plurality of data samples based on the detected MNI-favorable data samples, the NUMA or indifferent labels, and the calculated index values.

11. The method of claim 10, including categorizing the plurality of data samples as at least one of MNI memory mode-favorable, NUMA memory mode-favorable, and indifferent.

12. The method of claim 10, wherein the method is performed while a user is running at least one of a workload and an application.

13. The method of claim 10, wherein the method is performed after a workload or application associated with the plurality of data samples is complete.

14. The method of claim 10, wherein the remote data bandwidth threshold includes a performance penalty to compensate for associated system latencies.

15. The method of claim 10, including:
determining an overall favorable memory mode for a workload containing the plurality of data samples; and
recommending the overall favorable memory mode to a user.

* * * * *